UNITED STATES PATENT OFFICE.

WERNER KELBE, OF CARLSRUHE, BADEN, ASSIGNOR TO THE ACTIEN-GESELLSCHAFT FÜR CHEMISCHE INDUSTRIE, OF RHEINAU, NEAR MANNHEIM, GERMANY.

PROCESS OF OBTAINING RETENE.

SPECIFICATION forming part of Letters Patent No. 386,830, dated July 31, 1888.

Application filed April 4, 1888. Serial No. 269,601. (No specimens.) Patented in Luxemburg September 30, 1887, No. 900; in France October 3, 1887, No. 186,480, and in Belgium October 3, 1887, No. 79,078.

*To all whom it may concern:*

Be it known that I, WERNER KELBE, a subject of the Duke of Brunswick, residing at Carlsruhe, in the Grand Duchy of Baden, German Empire, have invented a new and useful Improvement in Process of Manufacturing Retene from Resin-Oil, (for which I have obtained the following patents: France, No. 186,480, dated October 3, 1887; Belgium, No. 79,078, dated October 3, 1887; Luxemburg, No. 900, dated September 30, 1887,) of which the following is a specification.

This invention relates to a new process of manufacturing retene (the formula of which is $C_{18}H_{18}$) from resin-oil.

Resin oil, being a product of the dry distillation of colophony, is heated in the presence of a required quantity of sulphur, having a weight of about one-third of that of the resin-oil, in an iron vessel, preferably in a reflux cooler, until the formation of sulphide of hydrogen is entirely finished. The retene is now obtained from the residues either by distillation or by extraction by means of alcohol, benzine, petroleum-ether, or other suitable solvents. The raw retene thus obtained is finally purified by repeated crystallizations.

The formation of the retene ($C_{18}H_{18}$) from resin-oil respectively from the constituent of the same the tetrahydroretene, ($C_{18}H_{22}$,) which has essentially the same properties as the resin-oil, takes place by the agency of sulphur in separating hydrogen.

As regards the applicableness of the retene in the arts, its employment and that of its derivates takes place in a similar manner like that of the homologous anthracene, phenanthrene, and other analogous compounds.

Having now fully described the nature of this invention and in what manner the same is to be performed, I declare that what I claim is—

A process of manufacturing retene ($C_{18}H_{18}$) from resin-oil by heating the latter in the presence of sulphur in a vessel until the formation of sulphide of hydrogen is entirely finished, the raw retene being then obtained from the residues either by distillation or by extraction by means of suitable solvents—such as alcohol, benzine, petroleum-ether, and the like—and finally purified by means of repeated crystallizations, substantially as set forth.

In testimony whereof I have signed my name to this specification in the presence of two subscribing witnesses.

WERNER KELBE.

Witnesses:
KARL BEUHL,
EMIL SENAUER.